US006932480B2

(12) United States Patent
Wada et al.

(10) Patent No.: US 6,932,480 B2
(45) Date of Patent: Aug. 23, 2005

(54) IMAGE PROCESSING SYSTEM, PROJECTOR, PROGRAM, INFORMATION STORAGE MEDIUM AND IMAGE PROCESSING METHOD

(75) Inventors: Osamu Wada, Ina (JP); Masanobu Kobayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/858,381

(22) Filed: Jun. 2, 2004

(65) Prior Publication Data

US 2005/0018144 A1 Jan. 27, 2005

(30) Foreign Application Priority Data

Jun. 26, 2003 (JP) .................................... 2003-182734
Jan. 16, 2004 (JP) .................................... 2004-009026

(51) Int. Cl.[7] ............................................. G03B 21/14
(52) U.S. Cl. ........................ 353/69; 353/70; 353/101
(58) Field of Search ............................ 535/69, 70, 101, 535/122; 348/745, 806

(56) References Cited

U.S. PATENT DOCUMENTS

| | | | | |
|---|---|---|---|---|
| 6,450,647 | B1 | * 9/2002 | Takeuchi | 353/69 |
| 6,520,647 | B2 | * 2/2003 | Raskar | 353/70 |
| 2003/0090635 | A1 | * 5/2003 | Cheng et al. | 353/70 |
| 2003/0210381 | A1 | * 11/2003 | Itaki | 353/70 |
| 2004/0201825 | A1 | * 10/2004 | Kobayashi et al. | 353/70 |
| 2005/0018144 | A1 | * 1/2005 | Wada et al. | 353/69 |
| 2005/0024598 | A1 | * 2/2005 | Inoue | 353/69 |
| 2005/0041216 | A1 | * 2/2005 | Kobayashi | 353/69 |
| 2005/0041217 | A1 | * 2/2005 | Tajima | 353/69 |
| 2005/0046804 | A1 | * 3/2005 | Akutsu | 353/70 |
| 2005/0052620 | A1 | * 3/2005 | Tamura | 353/69 |

FOREIGN PATENT DOCUMENTS

| | | |
|---|---|---|
| JP | 11-041428 | 2/1999 |
| JP | 2000-241874 | 9/2000 |

* cited by examiner

*Primary Examiner*—William C. Dowling
(74) *Attorney, Agent, or Firm*—Oliff & Berridge, PLC

(57) ABSTRACT

To provide an image processing system and others which can project an image more accurately and at higher speed while using a screen or the like as effectively as possible, there is provided a projector including a calibration image information generating section, an image projection section having a view angle adjusting section and a lens shift section for adjusting an optical axis of a projection lens to project the calibration image onto the screen or the like, a sensing section which senses a region including the projected calibration image and the screen or the like through a sensing surface to generate sensing information, a projection area information generating section which generates projection area information based on the sensing information, a target area information generating section which generates target area information based on the sensing information, and a projection control section which controls the view angle adjusting section and lens shift section based on the projection area information and the target area information.

16 Claims, 9 Drawing Sheets

IMAGE PROCESSING SYSTEM, PROJECTOR, PROGRAM, INFORMATION STORAGE MEDIUM AND IMAGE PROCESSING METHOD

Japanese Patent Application No. 2003-182734, filed on Jun. 26, 2003, and Japanese Patent Application No. 2004-9026, filed on Jan. 16, 2004, are hereby incorporated by reference in their entirety.

BACKGROUND OF THE INVENTION

The present invention relates to an image processing system, projector, program, information storage medium and image processing method having a lens shift function and a zoom function.

In order to display an appropriate image from an image projecting device such as a projector, it is necessary for the image projecting device to perform the adjustment of view angle (zoom adjustment), the adjustment of image display position and so on.

In general, however, the adjustment of view angle and adjustment of image display position are performed by a user. This is very troublesome for the user.

In addition, there is a case that an image is distorted to create a so-called keystone distortion in the vertical or horizontal direction depending on the relative angle between the optical axis of a light projected from an image projection device such as a projector and an object onto which the light is projected, such as a screen.

For such a reason, the image projection device must project an image after its distortion has been removed.

However, the general image projecting device having a distortion correcting function includes an inclination sensor which can only correct the distortion of an image in the vertical direction, but not in the horizontal direction.

Moreover, the distortion in the horizontal direction has been semi-automatically corrected based on information provided when a user has indicated four corner points on a screen through a mouse. It is troublesome for the user to indicate the four corner points on the screen through the mouse.

To solve such a problem, for example, Japanese Patent Laid-Open No. 2000-241874 has proposed an automatic image positioning method in a projector, comprising the steps of projecting a predetermined test pattern from the projector onto a screen; using a monitor camera to capture the image of the test pattern on the screen; and analyzing the image data of the captured test pattern image to adjust the focus of the projector. The automatic image positioning method of Japanese Patent Laid-Open No. 2000-241874 displays the projected image on the screen at its center by projecting a rectangular all-white image on the screen as a test pattern image, sensing the all-white image through the monitor camera to detect the position of the screen within the all-white image, using a projection lens having a scaling function to enlarge or reduce the projected image until it reaches the end points of the screen, and adjusting the depression and elevation angles in the projection lens. Furthermore, the automatic image positioning method of Japanese Patent Laid-Open No. 2000-241874 adjusts the keystone distortion of the projected image by calculating the adjusted value of the keystone distortion based on the positions of the end points in the screen and all-white image.

However, in such a technique of Japanese Patent Laid-Open No. 2000-241874 that the angle of view is adjusted by using the scaling function of the projection lens to enlarge or reduce the projected image until it reaches the end points of the sensed screen, the process takes much time. Furthermore, the technique of Japanese Patent Laid-Open No. 2000-241874 cannot be applied to a case where the aspect ratio of the screen is different from that of the projected image. Additionally, Japanese Patent Laid-Open No. 2000-241874 describes the adjustment of the image display position by adjusting the depression and elevation angles of the projection lens to display the projected image on the screen at its center, but does not concretely disclose how the process has been performed.

Moreover, in the technique of Japanese Patent Laid-Open No. 2000-241874 where the adjusted value of the keystone distortion is calculated based on the positions of the end points in the screen and all-white image and, for example, if the screen is square, the correction of the keystone distortion will be carried out while the projected image remains distorted.

When the projector or the like is to project and display an easily viewable image, it is required to display the image more largely and also to project the image more highly after the adjustments of view angle, image display position and image distortion have been performed.

BRIEF SUMMARY OF THE INVENTION

The present invention is made in view of the above-mentioned problems, and may provide an image processing system, projector, program, information storage medium and image processing method enabling to project an image more accurately at a higher speed while using a target area of a projection target such as a screen as effectively as possible.

According to a first aspect of the present invention, there are provided an image processing system and a projector each of which comprises:

calibration image information generating means for generating image information which is used to display a calibration image;

projection means having a view angle adjusting section which adjusts a view angle and a lens shift section which adjusts an optical axis of a projection lens, the projection means projecting the calibration image onto a rectangular target area, based on the image information;

sensing means for sensing a region including the projected calibration image and the target area through a sensing surface to generate sensing information;

projection area information generating means for generating projection area information which indicates four corner coordinates of the calibration image on the sensing surface, based on the sensing information;

target area information generating means for generating target area information which indicates four corner coordinates of the target area on the sensing surface, the straight line intersects the one side, based on the sensing information; and projection control means for controlling the view angle adjusting section and the lens shift section, based on the projection area information and the target area information, wherein the projection control means derives a reference line segment vector which indicates a line segment extending from an intersection between diagonal lines of the calibration image on the sensing surface to one vertex of the calibration image, based on the projection area information;

wherein the projection control means derives an enlarged line segment vector which indicates a line segment extending from an intersection between diagonal lines of the target area on the sensing surface to an intersection between one side of the target area and a straight line drawn in a direction of the reference line segment vector, based on the target area information;

wherein the projection control means derives magnification by computing the enlarged line segment vector/the reference line segment vector;

wherein the projection control means controls the view angle adjusting section based on the derived magnification; and wherein the projection control means controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

According to a second aspect of the present invention, there are provided an image processing system and a projector each of which comprises:

a calibration image information generating section which generates image information which is used to display a calibration image;

a projection section which has a view angle adjusting section which adjusts a view angle and a lens shift section which adjusts an optical axis of a projection lens, the projection section projecting the calibration image onto a rectangular target area, based on the image information;

a sensing section which senses a region including the projected calibration image and the target area through a sensing surface to generate sensing information;

a projection area information generating section which generates projection area information which indicates four corner coordinates of the calibration image on the sensing surface, based on the sensing information;

a target area information generating section which generates target area information which indicates four corner coordinates of the target area on the sensing surface, based on the sensing information; and a projection control section which controls the view angle adjusting section and the lens shift section, based on the projection area information and the target area information, wherein the projection control section derives a reference line segment vector which indicates a line segment extending from an intersection between diagonal lines of the calibration image on the sensing surface to one vertex of the calibration image, based on the projection area information;

wherein the projection control section derives an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

wherein the projection control section derives magnification by computing the enlarged line segment vector/the reference line segment vector;

wherein the projection control section controls the view angle adjusting section based on the derived magnification; and wherein the projection control section controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

According to a third aspect of the present invention, there is provided a computer-readable program causing a computer to function as:

calibration image information generating means for generating image information which is used to display a calibration image;

projection control means for controlling a projection section which has a view angle adjusting section which adjusts a view angle and a lens shift section which adjusts an optical axis of a projection lens, the projection section projecting the calibration image onto a rectangular target area, based on the image information;

sensing control means for controlling a sensing section which senses a region including the projected calibration image and the target area through a sensing surface to generate sensing information;

projection area information generating means for generating projection area information which indicates four corner coordinates of the calibration image on the sensing surface, based on the sensing information; and target area information generating means for generating target area information which indicates four corner coordinates of the target area on the sensing surface, based on the sensing information, wherein the projection control means derives a reference line segment vector which indicates a line segment extending from an intersection between diagonal lines of the calibration image on the sensing surface to one vertex of the calibration image, based on the projection area information;

wherein the projection control means derives an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

wherein the projection control means derives magnification by computing the enlarged line segment vector/the reference line segment vector;

wherein the projection control means controls the view angle adjusting section based on the derived magnification; and wherein the projection control means controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

According to fourth aspect of the present invention, there is provided an information storage medium storing a computer-readable program which is the above-described program.

According to a fifth aspect of the present invention, there is provided an image processing method comprising:

projecting a calibration image onto a rectangular target area;

sensing a region including the projected calibration image and the target area through a sensing surface to generate sensing information;

generating projection area information which indicates four corner coordinates of the calibration image on the sensing surface and target area information which indicates four corner coordinates of the target area on the sensing surface, based on the generated sensing information;

deriving a reference line segment vector which indicates a line segment extending from an intersection between diagonal lines of the calibration image on the sensing surface to one vertex of the calibration image, based on the projection area information;

deriving an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

deriving magnification by computing the enlarged line segment vector/the reference line segment vector;

controlling a view angle adjusting section which adjusts a view angle of a projection section based on the magnification; and controlling a lens shift section which adjusts an optical axis of the projection section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

The above image processing system and others can detect positions, sizes and intersections between diagonal lines of the projection area and target area, based on the projection area information and the target area information. The image processing system and others can also enlarge and project an image based on the detected intersections between diagonal lines and other data.

Thus, the image processing system and others can project an image accurately and at higher speed while using the target area of the projection target such as a screen as effectively as possible.

Moreover, since the image processing system and others can perform image processing by using only one sensing section, they can project an image at higher speed than the case where a plurality of sensing sections are used.

According to a sixth aspect of the present invention, there are provided an image processing system and a projector each of which comprises:

calibration image information generating means for generating image information which is used to display a calibration image;

projection means having a view angle adjusting section which adjusts a view angle and a lens shift section which adjusts an optical axis of a projection lens, the projection means projecting the calibration image onto a rectangular target area, based on the image information;

sensing means for sensing a region including the projected calibration image and the target area through a sensing surface to generate sensing information;

projection area information generating means for generating projection area information which indicates four corner coordinates of the calibration image on the sensing surface;

target area information generating means for generating target area information which indicates four corner coordinates of the target area on the sensing surface, based on the sensing information; and projection control means for controlling the view angle adjusting section and the lens shift section, based on the projection area information and the target area information, wherein the projection control means controls the lens shift section based on the projection area information and the target area information so that a central position of the calibration image on the sensing surface moves to a central position of the target area on the sensing surface;

wherein the projection control means derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control means controls the view angle adjusting section based on the magnification.

According to a seventh aspect of the present invention, there are provided an image processing system and a projector each of which comprises:

a calibration image information generating section which generates image information which is used to display a calibration image;

a projection section which has a view angle adjusting section which adjusts a view angle and a lens shift section which adjusts an optical axis of a projection lens, the projection section projecting the calibration image onto a rectangular target area, based on the image information;

a sensing section which senses a region including the projected calibration image and the target area through a sensing surface to generate sensing information;

a projection area information generating section which generates projection area information which indicates four corner coordinates of the calibration image on the sensing surface;

a target area information generating section which generates target area information which indicates four corner coordinates of the target area on the sensing surface, based on the sensing information; and a projection control section which controls the view angle adjusting section and the lens shift section, based on the projection area information and the target area information, wherein the projection control section controls the lens shift section based on the projection area information and the target area information so that a central position of the calibration image on the sensing surface moves to a central position of the target area on the sensing surface;

wherein the projection control section derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control section controls the view angle adjusting section based on the magnification.

According to an eighth aspect of the present invention, there is provided a computer-readable program causing a computer to function as:

calibration image information generating means for generating image information which is used to display a calibration image;

projection control means for controlling a projection section which has a view angle adjusting section which adjusts a view angle and a lens shift section which adjusts an optical axis of a projection lens, the projection section projecting the calibration image onto a rectangular target area, based on the image information;

sensing control means for controlling a sensing section which senses a region including the projected calibration image and the target area through a sensing surface to generate sensing information;

projection area information generating means for generating projection area information which indicates four corner coordinates of the calibration image on the sensing surface, based on the sensing information; and target area information generating means for generating target area information which indicates four corner coordinates of the target area on the sensing surface, wherein the projection control means controls the lens shift section based on the projection area information and the target area information so that a central position of the calibration image on the sensing surface moves to a central position of the target area on the sensing surface;

wherein the projection control means derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control means controls the view angle adjusting section based on the magnification.

According to a ninth aspect of the present invention, there is provided an information storage medium storing a computer-readable program which is the above-described program.

According to a tenth aspect of the present invention, there is provided an image processing method comprising:

projecting a calibration image onto a rectangular target area;

sensing a region including the projected calibration image and the target area through a sensing surface to generate sensing information;

generating projection area information which indicates four corner coordinates of the calibration image on the sensing surface and target area information which indicates four corner coordinates of the target area on the sensing surface, based on the generated sensing information;

controlling a lens shift section which adjusts an optical axis of a projection section based on the projection area information and the target area information so that a central position of the calibration image on the sensing surface moves to a central position of the target area on the sensing surface;

deriving magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and controlling a view angle adjusting section which adjusts a view angle of the projection section, based on the magnification.

The above image processing system and others can detect positions, sizes and central positions of the projection area and target area, based on the projection area information and the target area information. The image processing system and others can enlarge and project an image based on the detected central positions and other data.

Thus, the image processing system and others can project an image accurately and at higher speed while using the target area of the projection target such as a screen as effectively as possible.

Moreover, since the image processing system and others can perform image processing by using only one sensing section, they can project an image at higher speed than the case where a plurality of sensing sections are used.

Each of the above-described image processing system and projector may further comprise distortion correcting means for correcting distortion in the calibration image, and the projection area information generating means may generate information which indicates four corner coordinates of the calibration image on the sensing surface after distortion correction based on the sensing information, as the projection area information.

Each of the above-described program and information storage medium may cause a computer to function as distortion correcting means for correcting distortion in the calibration image, and the projection area information generating means may generate information which indicates four corner coordinates of the calibration image on the sensing surface after distortion correction based on the sensing information, as the projection area information.

The above-described image processing method may comprise: generating information which indicates four corner coordinates of the calibration image on the sensing surface after distortion correction based on the sensing information, as the projection area information.

The above image processing system and others can project an image while effectively using the target area of the projection target such as a screen, by causing the projection control means and others to perform adjustments of view angle (or image zooming) and display position by using the corrected calibration image, based on the projection area information indicating the four corner coordinates of the calibration image after distortion correction.

DETAILED DESCRIPTION OF THE EMBODIMENTS

Figure 1:
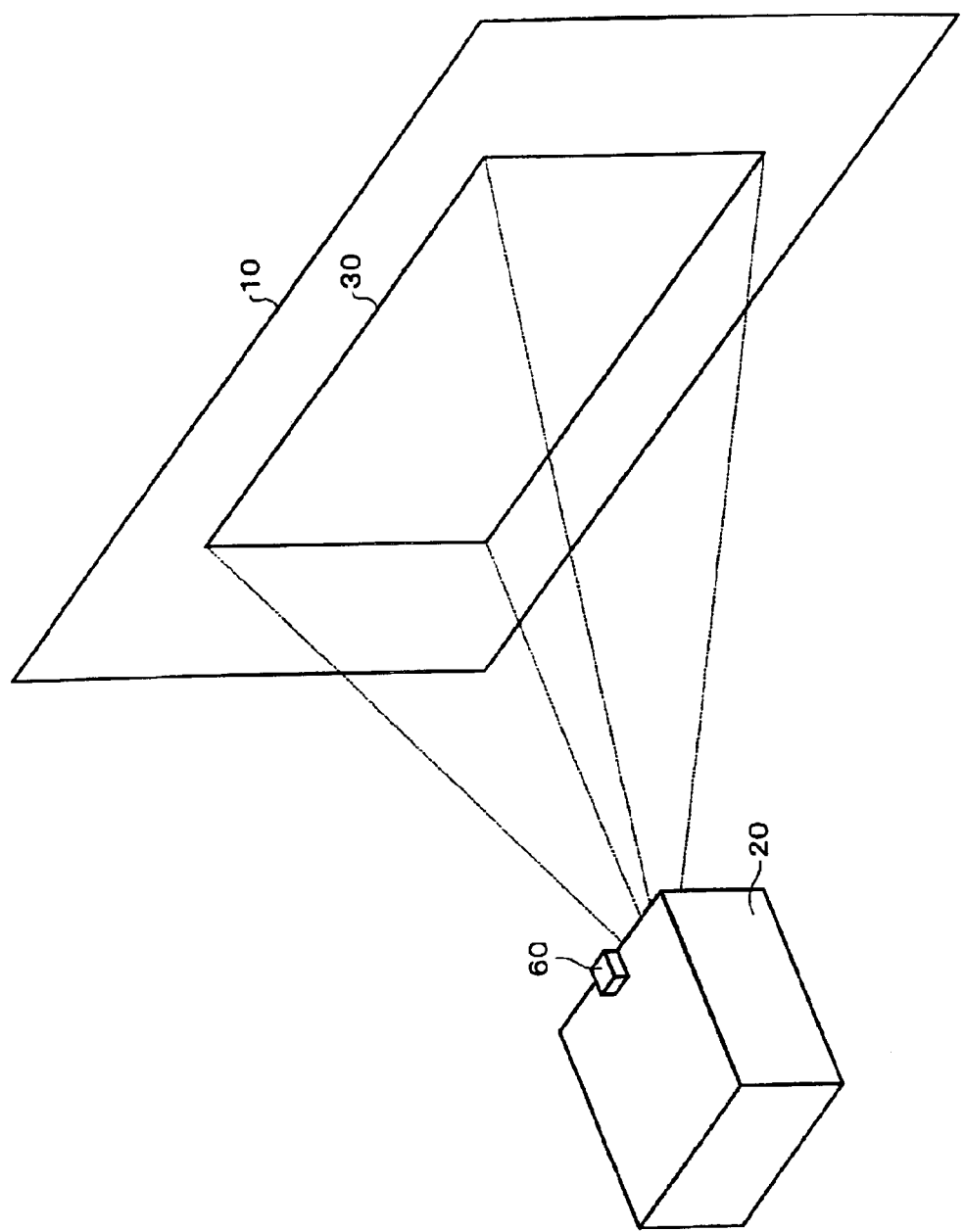
FIG. 1 is a diagram schematically showing the image projection.

Embodiments of the present invention applied to a projector having an image distortion correcting function will be described with reference to the drawing. Note that the embodiments described below do not in any way limit the scope of the present invention defined by the claims laid out herein. Similarly, all the elements of the embodiments below should not be taken as essential requirements defined by the claims herein.

Entire System

FIG. 1 is a diagram showing image projection.

A projector 20, which is a kind of image processing system, projects an image onto a screen 10 which is a kind of projection target having a rectangular target area. Thus, a projected image 30 is displayed on the screen 10.

In this embodiment, the projector 20 is not positioned directly in front of the screen 10. For such a reason, the projected image 30 has a distortion (e.g., a so-called keystone distortion).

In this embodiment, a sensor 60, which is part of image pickup means, is to sense a region including the projected image 30. The projector 20 projects the image minimizing the image projection area of the screen 10 while maintaining the aspect ration in the image by controlling a view angle adjusting section and a lens shift section in the projector 20 based on the sensing information from the sensor 60.

For example, if the screen is oblong in the horizontal direction, the projector 20 projects the image 30 while maintaining its aspect ratio so that the central position and lateral sides of the screen coincide with those of the projected image 30, respectively. If the screen is oblong in the vertical direction, the projector 20 projects the image 30 while maintaining its aspect ratio so that the central position and top and bottom sides of the screen coincide with those of the projected image 30, respectively.

In such a manner, the projector 20 can project an image easily viewable by a user by projecting the image maximizing the target area while maintaining the aspect ratio in the image.

Functional Blocks

The function blocks of the projector 20 for implementing these functions will now be described.

Figure 2:
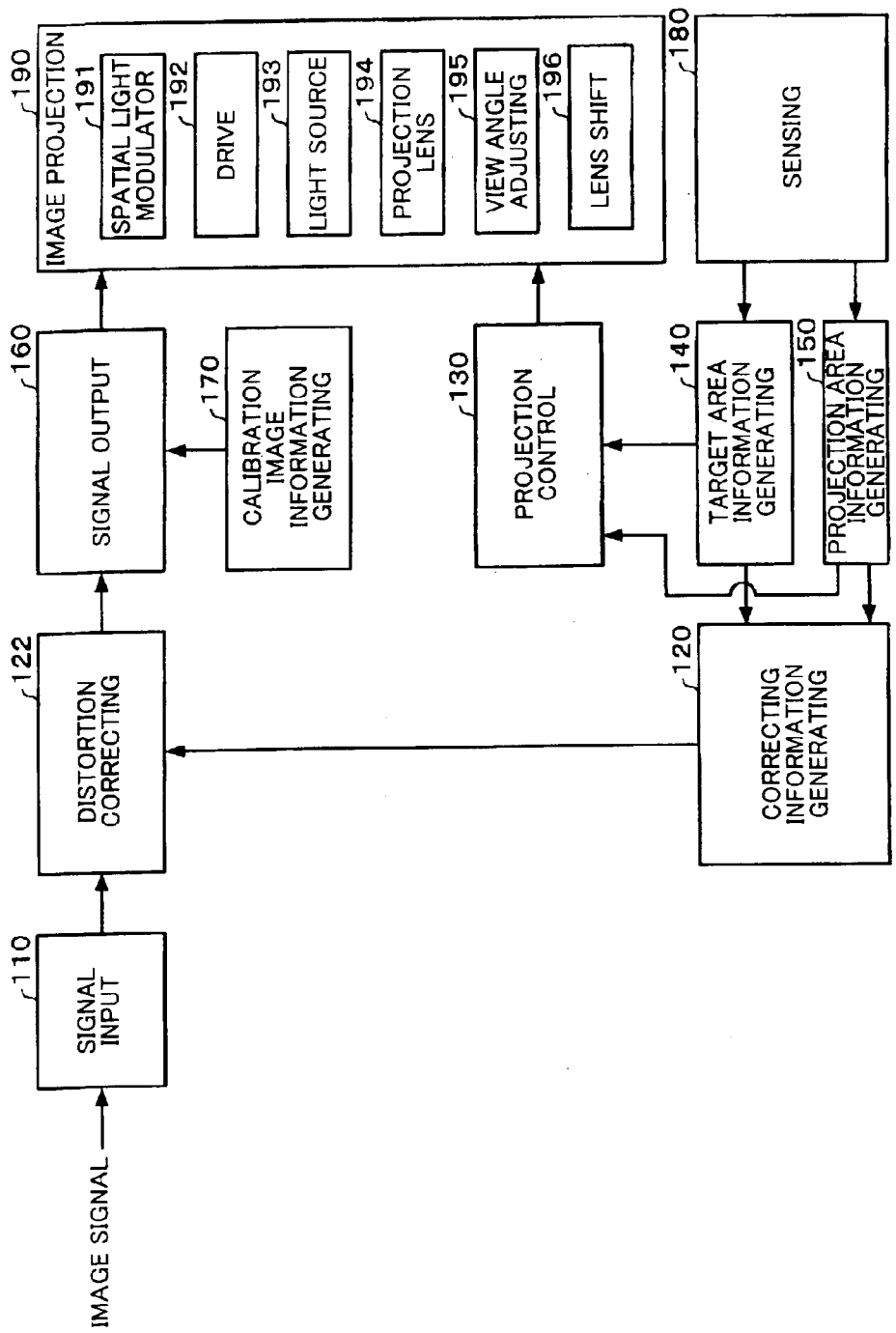
FIG. 2 is a functional block diagram showing the projector according to one embodiment of the present invention.

FIG. 2 is a functional block diagram of the projector 20 according to one embodiment of the present invention.

The projector 20 includes a signal input section 110 for inputting an image signal, a distortion correcting section 122 for correcting the input image signal to correct a distortion in the image, a signal output section 160 for outputting the correct image signal, an image projection section 190 which is a kind of projection means for projecting an image based on the image signal, and a calibration image information generating section 170 for generating calibration image information.

The projector 20 also includes a sensing section 180 for sensing a region including the projected image 30 through a sensing surface to generate sensing information, a target area information generating section 140 for selecting the area of the screen 10 in the sensing surface of the sensor 60, based on the sensing information, a projection area information generating section 150 for selecting the area of the projected image 30 in the sensing surface of the sensor 60, based on the sensing information, and a correcting information generating section 120 for generating distortion correcting information. The sensor 60 is included in the sensing section 180.

The image projection section 190 includes a spatial light modulator 191, a drive section 192 for driving the spatial light modulator 191, a light source 193, a projection lens 194, a view angle adjusting section 195 for adjusting the view angle of the projection lens 194, and a lens shift section 196 for adjusting the optical axis of the projection lens 194.

The drive section 192 drives the spatial light modulator 191 based on an image signal from the signal output section 160. The image projection section 190 projects light from the light source 193 through the spatial light modulator 191 and projection lens 194.

The projector 20 further includes a projection control section 130 for controlling the view angle adjusting section 195 and lens shift section 196.

Examples of hardware components for implementing these functions of the projector 20 in a computer are described below.

Figure 3:
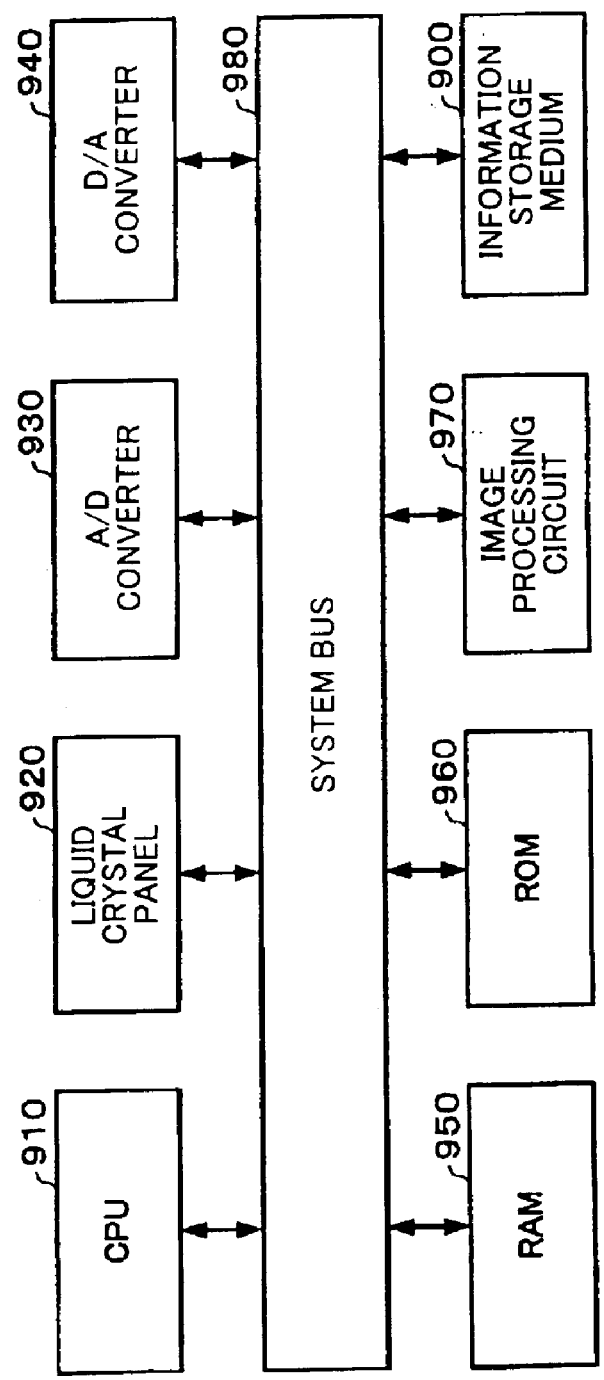
FIG. 3 is a block diagram showing hardware configuration of the projector according to one embodiment of the present invention.

FIG. 3 is a hardware block diagram showing the projector 20 according to one embodiment of the present invention.

For example, the signal input section 110 may be implemented, for example, by an A/D converter 930 or the like; the distortion correcting section 122 may be implemented, for example, by an image processing circuit 970, RAM 950, CPU 910 or the like; the projection control section 130 may be implemented, for example, by the CPU 910 or the like; the signal output section 160 may be implemented, for example, by a D/A converter 940 or the like; the correcting information generating section 120, target area information generating section 140, projection area information generating section 150 or calibration image information generating section 170 may be implemented, for example, by the image processing circuit 970, RAM 950 or the like; the sensing section 180 may be implemented, for example, by a CCD sensor, a CMOS sensor, an RGB sensor or the like; and the spatial light modulator 191 may be implemented, for example, by a crystal panel 920, a ROM 960 for storing a liquid crystal light valve driver for driving the liquid crystal panel 920 or the like.

These components are configured to mutually deliver the information therebetween through a system bus 980. Moreover, these components may be implemented, in part or wholly, by such hardware as circuits or by such software as drivers.

Furthermore, the functions of the projection control section 130 and the like may be implemented by the computer through a program read from an information storage medium 900, such a program being operative to cause the computer to function as the projection control section 130 and the like.

Such an information storage medium 900 may be accomplished, for example, by CD-ROM, DVD-ROM, ROM, RAM, HDD or the like through either of the contact or non-contact type reading mode.

Rather than the information storage medium 900, the aforementioned functions may be implemented into the computer by downloading a program or the like for implementing them from a host device or the like through a transmission channel.

Image Processing

The image processing using these components will be described below.

Figure 4:
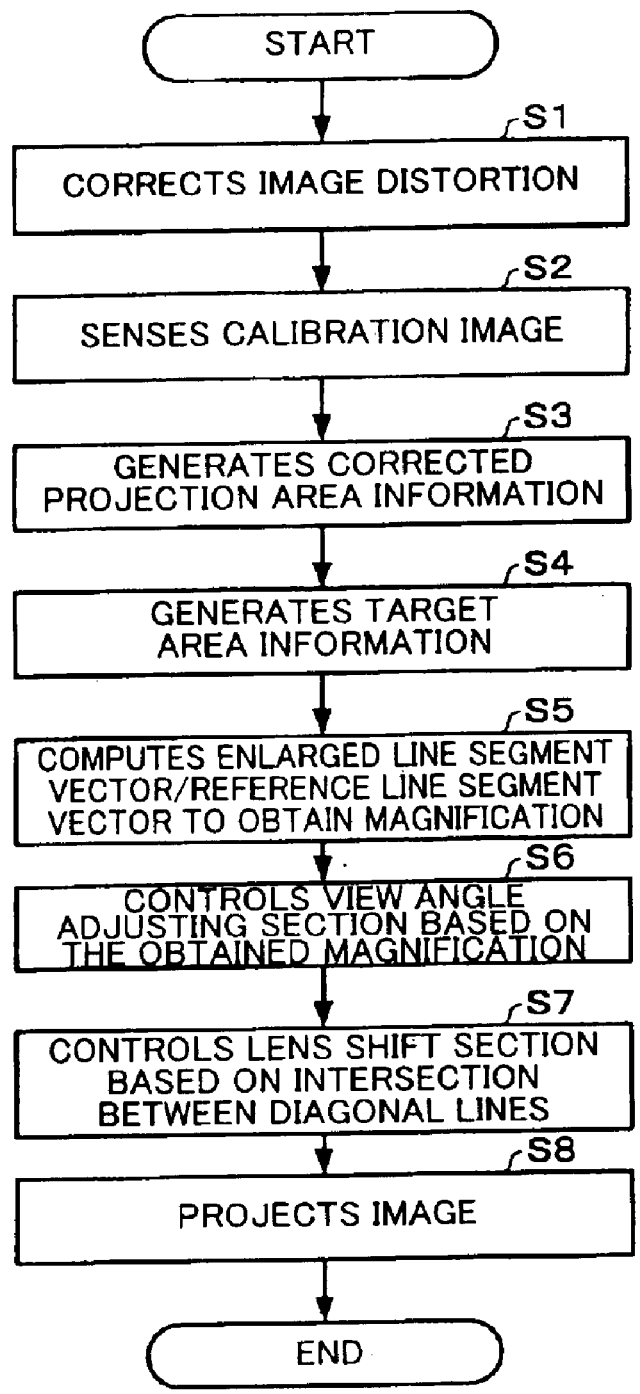
FIG. 4 is a flow chart for illustrating the image processing according to one embodiment of the present invention.

FIG. 4 is a flow chart showing the flow of the image processing according to one embodiment of the present invention.

A user corrects a distortion in the projected image 30 manually or using a general automatic keystone distortion correction function in the projector 20 (step S1). For example, the correcting information generating section 120 may detect the distortion in the image to generate distortion correcting information, based on information indicative of the target area from the target area information generating section 140 as well as information indicative of the area of the projected image from the projection area information generating section 150. The distortion correcting section 122 may then update correcting data based on the distortion correcting information and correct the image signal based on the updated correcting data.

The projector 20 projects a calibration image onto the screen 10 and the sensing section 180 senses the area including the calibration image and screen 10 to generate the sensing information (step S2).

More particularly, the calibration image information generating section 170 generates image information for a monochromatic all-white calibration image (the whole image being white), and the signal output section 160 outputs the digital signal of the generated image information toward the image projection section 190.

The image projection section 190 then projects the all-white calibration image toward the screen 10 based on the digital signal. Thus, the all-white calibration image (or projected image 30) will be displayed on the screen 10.

The sensing section 180 then senses the area including the projected image 30 and screen 10 through the sensing surface to generate the sensing information. Here, the sensing information is intended to be one that indicates an image signal value usable to generate such a luminance value as X-, Y- or Z-value for each pixel in the sensor 60. The X-, Y- and Z-values used herein are certain image signal values having machinery independence colors which are based on the International Standard defined by the International Commission on Illumination (CIE).

The projection area information generating section 150 generates the projection area information indicative of four corner coordinates on the projected image 30 after it has corrected for its image distortion in the sensing surface, based on the sensing information from the sensing section 180 (step S3).

The target area information generating section 140 further generates the target area information indicative of four corner coordinates on the screen 10 in the sensing surface, based on the sensing information from the sensing section 180 (step S4).

Because the calibration image is a monochromatic image, the target area information generating section 140 and projection area information generating section 150 can detect the areas of the projected image 30 and screen 10 based on the difference between the luminance values every pixel.

In order to adjust the size and display position of the projected image 30, the projection control section 130 adjusts the view angle by controlling the view angle adjusting section 195 to display the image in the full target area on the screen 10, and controls the lens shift section 196 to adjust the optical axis of the projection lens 194 to display the image on the screen 10 at its appropriate position. First of all, a technique of adjusting the view angle will be described below.

Figure 5:
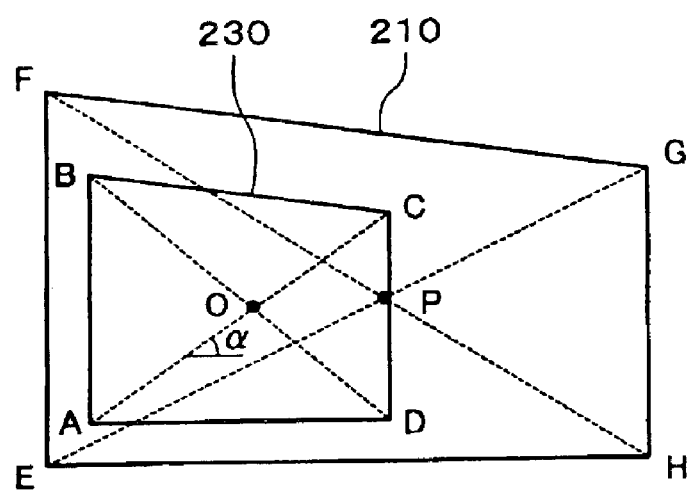
FIG. 5 is a diagram showing a projected image and a screen on a sensing surface according to one embodiment of the present invention.

FIG. 5 is a diagram showing a projected image 230 and a screen 210 on a sensing surface according to one embodiment of the present invention.

It is now assumed that four corner coordinates in the projected image 230 are A, B, C and D, that the intersection between two diagonal lines in the projected image 230 is 0, that four corner coordinates in the screen 210 are E, F, G and H, and that the intersection between two diagonal lines in the screen 210 is P, as shown in FIG. 5. It is further assumed that the inclination of a line segment extending from the intersection 0 to a vertex A in the projected image 230 (which will be referred to "reference line segment vector") relative to the horizontal direction is $\alpha$.

Figure 6:
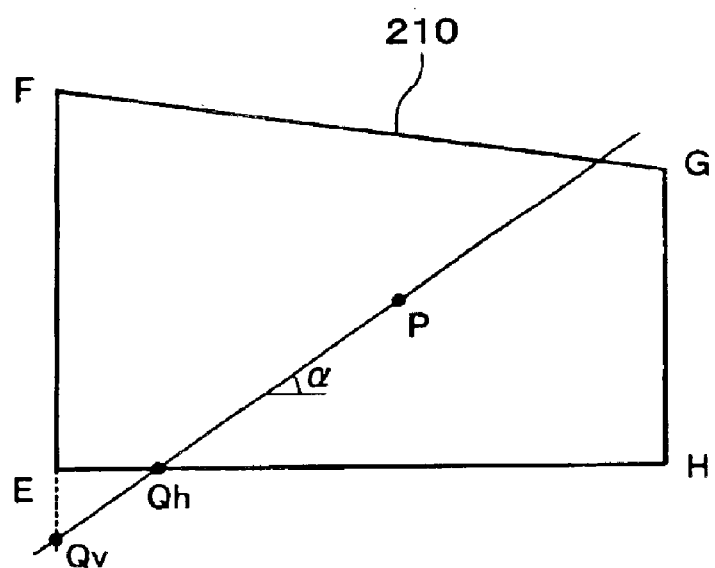
FIG. 6 is a diagram showing a ratio and a line segment according to one embodiment of the present invention.

FIG. 6 is a diagram showing a ratio and a line segment according to one embodiment of the present invention.

The projection control section 130 derives a line segment extending to an intersection Qh between a straight line drawn from the intersection P between two diagonal lines in the screen 210 relative to the orientation of the reference line segment vector (or inclination $\alpha$) and a side EH in the screen 210, such a line segment being referred to "enlarged line segment vector".

If the screen is oblong in the vertical direction, a line segment extending from the intersection P between the diagonal lines in the screen 210 to an intersection Qv between the aforementioned straight line and a vertical side is an enlarged line segment vector. When the Length of the line segment QvP is compared with the length of the line segment QhP, one shorter line segment may be taken as an enlarged line segment vector.

The projection control section 130 derives a magnification by computing the enlarged line segment vector/reference line segment vector (step S5). In this embodiment, QhP/AO becomes a numerical value indicative of the magnification.

The projection control section 130 further inputs the magnification and determines the amount of view angle adjustment based on a function for outputting it. And, the projection control section 130 controls the view angle adjusting section 195 based on the determined amount of view angle adjustment (step S6). Thus, the projector 20 can project an image enlarged with the aforementioned magnification. The projection control section 130 may determine the amount of view angle adjustment, for example, by use of a table in which the magnification is associated with the amount of view angle adjustment or the like, rather than the function.

Next, adjustment of the optical axis of the projection lens 194 will be described.

Figure 7:
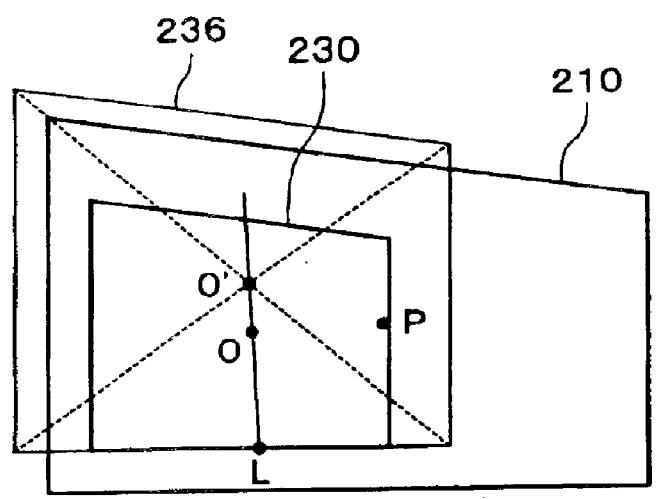
FIG. 7 is a diagram showing an enlarged projected image according to one embodiment of the present invention.
Figure 8:
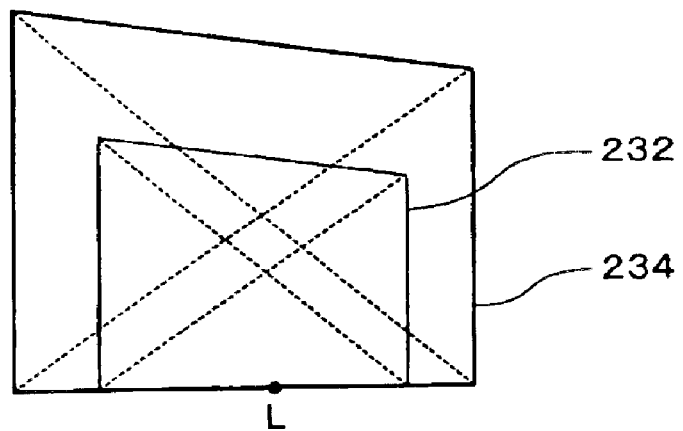
FIG. 8 is a diagram for illustrating the difference between zoomed images according to one embodiment of the present invention.

FIG. 7 is a diagram showing an enlarged projected image 230 according to one embodiment of the present invention. FIG. 8 is a diagram for illustrating the difference of zoomed images according to one embodiment of the present invention.

For example, it is now assumed that the central point L of the optical axis in a projected light is invariable in position both in a projected image 232 under the tele-side zooming condition and in a projected image 234 under the wide-side zooming condition, as shown in FIG. 8.

In this case, an enlarged image 236 will be provided when the projected image 230 is enlarged with a ratio of QhP/AO on the basis of the point L, as shown in FIG. 7. It is further assumed that the intersection between the diagonal lines in this projected image 236 is O'.

The projection control section 130 determines an amount of lens shift Sh in the horizontal (or x-axis) direction, based on the positional relationship between the intersection O' (O'x, O'y) and the other intersection P (Px, Py).

For example, Sh=g(Px−O'x), where g is a function of inputting an amount of displacement in sensor coordinates (or coordinates in the sensing surface) to output the amount of lens shift. It is of course that the projection control section 130 may determine the amount of lens shift by use of a table or the like in which the amount of sensor coordinate displacement is associated with the amount of lens shift.

The projection control section 130 also determines another amount of lens shift Sv in the vertical (or y-axis) direction, based on the positional relationship between the intersections O' and P. For example, Sv=h(Py−O'y), where h is a function of inputting the displacement in the sensor coordinates to output the amount of lens shift.

The projection control section 130 controls the lens shift section 196, based on the determined amounts of lens shift Sh and Sv (step S7).

In such a manner, the following projected image will be provided in the sensing surface by performing the view angle adjustment and lens shift.

Figure 9:
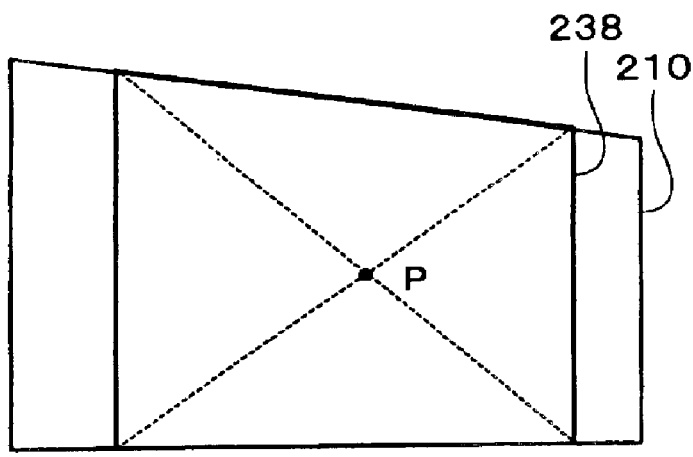
FIG. 9 is a diagram showing a adjusted projected image according to one embodiment of the present invention.

FIG. 9 is a diagram showing an adjusted projected image 238 according to one embodiment of the present invention.

The adjusted image 238 will have its horizontal sides coinciding with those of the screen 210 after the original projected image 230 has been enlarged, as shown in FIG. 9. Moreover, the intersection between the diagonal lines in the projected image 238 also coincides with the intersection P between the diagonal lines in the screen 210.

The projector 20 projects an image in such a state (step S8). Thus, the projector 20 can automatically adjust the size and position of the projected image 30 before it is projected.

As described, the projector 20 according to this embodiment can detect the positions and sizes of the projection area and target area as well as intersections between diagonal lines, based on the information of the projection area and target area. The projector 20 can projected an image after it has been enlarged on the based of the various detected factors such as the intersections between the diagonal lines and the like.

Thus, the projector 20 can project an image by using the target area of the projection target such as the screen 10 or the like as effectively as possible. In this case, the projector 20 can project an accurate image without depending on the shape of the screen 10 since the aspect ratio of the projected image 30 is invariable. In other words, the shape of the screen 10 may be square, rather than rectangular.

According to these embodiments, furthermore, both the adjustments o the view angle and lens shift can be automatically carried out only by using the single sensor 60 at the same time. Consequently, the projector 20 can project an image accurately and at higher speed after the position and size of the image have been adjusted.

Modifications

Note that the present invention is not limited to the above-described embodiments.

In the embodiments, for example, the projector 20 has carried out the image processing on the basis of the intersections between the diagonal lines. However, it may perform the image processing, for example, on the basis of the central position.

For example, the projection control section 130 may control the lens shift section 196 for adjusting the optical axis of the projection lens 194 so that the central position of the projected image 230 after it has been corrected for its distortion in the sensing surface moves to the central position of the screen 210 in the sensing surface, based on the projection area information and target area information.

The projection control section 130 may derive the magnification based on the ratio between the distance between the central position on a predetermined straight line through the central position of the projected image 230 (e.g., a horizontal or straight line or a diagonal line) and one side of the projected image 230 and the distance between the central position on the straight line and one side of the screen 210, in the state that the central position of the projected image 230 has moved to the central position of the screen 210.

Furthermore, the projection control section 130 may control the lens shift section 196 for adjusting the view angle of the projection lens 194, based on the magnification.

Such a technique can also cause the projector 20 to adjust the position and size of the projected image 30 in conformity with those of the screen 10 accurately and at higher speed by performing the zooming and lens shifting at the same time.

In the aforementioned embodiments, the view angle adjustment and lens shift are performed after the distortion of the projected image 30 has been corrected. However, the distortion correction may not be carried out if the projector 20 is disposed at a position in which the distortion correction is not required. Also in this case, the projector 20 can project an image accurately and at higher speed after the position and size of the image have been adjusted.

The sides of the projected image 30 are not necessarily required to coincide with the corresponding sides of the target area of the screen 10 accurately. The positions of the sides of the projected image 30 may be inward or outward of the corresponding sides of the target area.

The projector 20 may take a technique of adjusting the position and size of the projected image 30 by use of the correcting data or the like in a software manner, in place of the technique of adjusting the position and size of the projected image 30 by use of the view angle adjusting section 195 and lens shift section 196 in the hardware manner.

Although the aforementioned embodiments have used the all-white calibration image, a monochromatic calibration image other than the white color may be used. Furthermore, the projector 20 may project and sense an all-black calibration image (the whole image being black-colored) and an all-white calibration image and compare the ratios of luminance value for every pixel included in the sensing information to select a pixel area having its ratio of luminance value equal to or higher than a predetermined level as a projection area.

The projection target having the target area may be a blackboard, a white board or the like rather than the screen 10.

Although the aforementioned embodiments have used the projector 20 as an image processing system, the present invention may be effectively applied also to any one of various image processing systems for CRT (Cathode Ray Tube) displays, LED (Light Emitting Diode) displays, EL (Electro Luminescence) displays and the like, rather than the projector 20.

The projector 20 may correct the brightness or color of the projected image 30 in addition to its distortion, position and size.

The projector 20 may be any one of various other projectors such as a liquid crystal projector, a DMD (Digital Micromirror Device) projector and the like. DMD is a trademark possessed by the U.S. Texas Instruments.

The aforementioned functions may be implemented solely by the projector 20 or in such a manner that these functions are dispersedly implemented by a plurality of processing devices (e.g., a projector and a PC).

What is claimed is:

1. An image processing system comprising:

calibration image information generating means for generating image information which is used to display a calibration image;

projection means having a view angle adjusting section which adjusts a view angle and a lens shift section which adjusts an optical axis of a projection lens, the projection means projecting the calibration image onto a rectangular target area, based on the image information;

sensing means for sensing a region including the projected calibration image and the target area through a sensing surface to generate sensing information;

projection area information generating means for generating projection area information which indicates four corner coordinates of the calibration image on the sensing surface, based on the sensing information;

target area information generating means for generating target area information which indicates four corner coordinates of the target area on the sensing surface, based on the sensing information; and projection control means for controlling the view angle adjusting section and the lens shift section, based on the projection area information and the target area information, wherein the projection control means derives a reference line segment vector which indicates a line segment extending from an intersection between diagonal lines of the calibration image on the sensing surface to one vertex of the calibration image, based on the projection area information;

wherein the projection control means derives an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

wherein the projection control means derives magnification by computing the enlarged line segment vector/the reference line segment vector;

wherein the projection control means controls the view angle adjusting section based on the derived magnification; and wherein the projection control means controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

2. An image processing system comprising:

calibration image information generating means for generating image information which is used to display a calibration image;

projection means having a view angle adjusting section which adjusts a view angle and a lens shift section which adjusts an optical axis of a projection lens, the projection means projecting the calibration image onto a rectangular target area, based on the image information;

sensing means for sensing a region including the projected calibration image and the target area through a sensing surface to generate sensing information;

projection area information generating means for generating projection area information which indicates four corner coordinates of the calibration image on the sensing surface;

target area information generating means for generating target area information which indicates four corner coordinates of the target area on the sensing surface, based on the sensing information; and projection control means for controlling the view angle adjusting section and the lens shift section, based on the projection area information and the target area information, wherein the projection control means controls the lens shift section based on the projection area information and the target area information so that a central position of the calibration image on the sensing surface moves to a central position of the target area on the sensing surface;

wherein the projection control means derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control means controls the view angle adjusting section based on the magnification.

3. The image processing system as defined in claim 1, further comprising distortion correcting means for correcting distortion in the calibration image, wherein the projection area information generating means generates information which indicates four corner coordinates of the calibration image on the sensing surface after distortion correction based on the sensing information, as the projection area information.

4. An image processing system comprising:

a calibration image information generating section which generates image information which is used to display a calibration image;

a projection section which has a view angle adjusting section which adjusts a view angle and a lens shift section which adjusts an optical axis of a projection lens, the projection section projecting the calibration image onto a rectangular target area, based on the image information;

a sensing section which senses a region including the projected calibration image and the target area through a sensing surface to generate sensing information;

a projection area information generating section which generates projection area information which indicates four corner coordinates of the calibration image on the sensing surface, based on the sensing information;

a target area information generating section which generates target area information which indicates four corner coordinates of the target area on the sensing surface, based on the sensing information; and a projection control section which controls the view angle adjusting section and the lens shift section, based on the projection area information and the target area information, wherein the projection control section derives a reference line segment vector which indicates a line segment extending from an intersection between diagonal lines of the calibration image on the sensing surface to one vertex of the calibration image, based on the projection area information;

wherein the projection control section derives an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

wherein the projection control section derives magnification by computing the enlarged line segment vector/the reference line segment vector;

wherein the projection control section controls the view angle adjusting section based on the derived magnification; and wherein the projection control section controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

5. An image processing system comprising:

a calibration image information generating section which generates image information which is used to display a calibration image;

a projection section which has a view angle adjusting section which adjusts a view angle and a lens shift section which adjusts an optical axis of a projection lens, the projection section projecting the calibration image onto a rectangular target area, based on the image information;

a sensing section which senses a region including the projected calibration image and the target area through a sensing surface to generate sensing information;

a projection area information generating section which generates projection area information which indicates four corner coordinates of the calibration image on the sensing surface;

a target area information generating section which generates target area information which indicates four corner coordinates of the target area on the sensing surface, based on the sensing information; and a projection control section which controls the view angle adjusting section and the lens shift section, based on the projection area information and the target area information, wherein the projection control section controls the lens shift section based on the projection area information and the target area information so that a central position of the calibration image on the sensing surface moves to a central position of the target area on the sensing surface;

wherein the projection control section derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control section controls the view angle adjusting section based on the magnification.

6. A projector comprising:

calibration image information generating means for generating image information which is used to display a calibration image;

projection means having a view angle adjusting section which adjusts a view angle and a lens shift section which adjusts an optical axis of a projection lens, the projection means projecting the calibration image onto a rectangular target area, based on the image information;

sensing means for sensing a region including the projected calibration image and the target area through a sensing surface to generate sensing information;

projection area information generating means for generating projection area information which indicates four corner coordinates of the calibration image on the sensing surface, based on the sensing information;

target area information generating means for generating target area information which indicates four corner coordinates of the target area on the sensing surface, based on the sensing information; and projection control means for controlling the view angle adjusting section and the lens shift section, based on the projection area information and the target area information, wherein the projection control means derives a reference line segment vector which indicates a line segment extending from an intersection between diagonal lines of the calibration image on the sensing surface to one vertex of the calibration image, based on the projection area information;

wherein the projection control means derives an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

wherein the projection control means derives magnification by computing the enlarged line segment vector/the reference line segment vector;

wherein the projection control means controls the view angle adjusting section based on the derived magnification; and wherein the projection control means controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

7. A projector comprising:

calibration image information generating means for generating image information which is used to display a calibration image;

projection means having a view angle adjusting section which adjusts a view angle and a lens shift section which adjusts an optical axis of a projection lens, the projection means projecting the calibration image onto a rectangular target area, based on the image information;

sensing means for sensing a region including the projected calibration image and the target area through a sensing surface to generate sensing information;

projection area information generating means for generating projection area information which indicates four corner coordinates of the calibration image on the sensing surface;

target area information generating means for generating target area information which indicates four corner coordinates of the target area on the sensing surface, based on the sensing information; and projection control means for controlling the view angle adjusting section and the lens shift section, based on the projection area information and the target area information, wherein the projection control means controls the lens shift section based on the projection area information and the target area information so that a central position of the calibration image on the sensing surface moves to a central position of the target area on the sensing surface;

wherein the projection control means derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control means controls the view angle adjusting section based on the magnification.

8. A projector comprising:

a calibration image information generating section which generates image information which is used to display a calibration image;

a projection section which has a view angle adjusting section which adjusts a view angle and a lens shift section which adjusts an optical axis of a projection lens, the projection section projecting the calibration image onto a rectangular target area, based on the image information;

a sensing section which senses a region including the projected calibration image and the target area through a sensing surface to generate sensing information;

a projection area information generating section which generates projection area information which indicates four corner coordinates of the calibration image on the sensing surface, based on the sensing information;

a target area information generating section which generates target area information which indicates four corner coordinates of the target area on the sensing surface, based on the sensing information; and a projection control section which controls the view angle adjusting section and the lens shift section, based on the projection area information and the target area information, wherein the projection control section derives a reference line segment vector which indicates a line segment extending from an intersection between diagonal lines of the calibration image on the sensing surface to one vertex of the calibration image, based on the projection area information;

wherein the projection control section derives an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

wherein the projection control section derives magnification by computing the enlarged line segment vector/the reference line segment vector;

wherein the projection control section controls the view angle adjusting section based on the derived magnification; and wherein the projection control section controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

9. A projector comprising:

a calibration image information generating section which generates image information which is used to display a calibration image;

a projection section which has a view angle adjusting section which adjusts a view angle and a lens shift section which adjusts an optical axis of a projection lens, the projection section projecting the calibration image onto a rectangular target area, based on the image information;

a sensing section which senses a region including the projected calibration image and the target area through a sensing surface to generate sensing information;

a projection area information generating section which generates projection area information which indicates four corner coordinates of the calibration image on the sensing surface;

a target area information generating section which generates target area information which indicates four corner coordinates of the target area on the sensing surface, based on the sensing information; and a projection control section which controls the view angle adjusting section and the lens shift section, based on the projection area information and the target area information, wherein the projection control section controls the lens shift section based on the projection area information and the target area information so that a central position of the calibration image on the sensing surface moves to a central position of the target area on the sensing surface;

wherein the projection control section derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control section controls the view angle adjusting section based on the magnification.

10. A computer-readable program causing a computer to function as:

calibration image information generating means for generating image information which is used to display a calibration image;

projection control means for controlling a projection section which has a view angle adjusting section which adjusts a view angle and a lens shift section which adjusts an optical axis of a projection lens, the projection section projecting the calibration image onto a rectangular target area, based on the image information;

sensing control means for controlling a sensing section which senses a region including the projected calibration image and the target area through a sensing surface to generate sensing information;

projection area information generating means for generating projection area information which indicates four corner coordinates of the calibration image on the sensing surface, based on the sensing information; and target area information generating means for generating target area information which indicates four corner coordinates of the target area on the sensing surface, based on the sensing information, wherein the projection control means derives a reference line segment vector which indicates a line segment extending from an intersection between diagonal lines of the calibration image on the sensing surface to one vertex of the calibration image, based on the projection area information;

wherein the projection control means derives an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

wherein the projection control means derives magnification by computing the enlarged line segment vector/the reference line segment vector;

wherein the projection control means controls the view angle adjusting section based on the derived magnification; and wherein the projection control means controls the lens shift section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

11. A computer-readable program causing a computer to function as:

calibration image information generating means for generating image information which is used to display a calibration image;

projection control means for controlling a projection section which has a view angle adjusting section which adjusts a view angle and a lens shift section which adjusts an optical axis of a projection lens, the projection section projecting the calibration image onto a rectangular target area, based on the image information;

sensing control means for controlling a sensing section which senses a region including the projected calibration image and the target area through a sensing surface to generate sensing information;

projection area information generating means for generating projection area information which indicates four corner coordinates of the calibration image on the sensing surface, based on the sensing information; and target area information generating means for generating target area information which indicates four corner coordinates of the target area on the sensing surface, wherein the projection control means controls the lens shift section based on the projection area information and the target area information so that a central position of the calibration image on the sensing surface moves to a central position of the target area on the sensing surface;

wherein the projection control means derives magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and wherein the projection control means controls the view angle adjusting section based on the magnification.

12. An information storage medium storing a computer-readable program which is the program as defined in claim 10.

13. An information storage medium storing a computer-readable program which is the program as defined in claim 11.

14. An image processing method comprising:

projecting a calibration image onto a rectangular target area;

sensing a region including the projected calibration image and the target area through a sensing surface to generate sensing information;

generating projection area information which indicates four corner coordinates of the calibration image on the sensing surface and target area information which indicates four corner coordinates of the target area on the sensing surface, based on the generated sensing information;

deriving a reference line segment vector which indicates a line segment extending from an intersection between diagonal lines of the calibration image on the sensing surface to one vertex of the calibration image, based on the projection area information;

deriving an enlarged line segment vector which indicates a line segment extending from an intersection between diagonal lines of the target area on the sensing surface to an intersection between one side of the target area and a straight line drawn in a direction of the reference line segment vector, the straight line intersects the one side, based on the target area information;

deriving magnification by computing the enlarged line segment vector/the reference line segment vector;

controlling a view angle adjusting section which adjusts a view angle of a projection section based on the magnification; and controlling a lens shift section which adjusts an optical axis of the projection section based on an intersection between the diagonal lines of the calibration image on the sensing surface and an intersection between the diagonal lines of the target area on the sensing surface after view angle adjustment so that the intersection between the diagonal lines of the calibration image moves to the intersection between the diagonal lines of the target area.

15. An image processing method comprising:

projecting a calibration image onto a rectangular target area;

sensing a region including the projected calibration image and the target area through a sensing surface to generate sensing information;

generating projection area information which indicates four corner coordinates of the calibration image on the sensing surface and target area information which indicates four corner coordinates of the target area on the sensing surface, based on the generated sensing information;

controlling a lens shift section which adjusts an optical axis of a projection section based on the projection area information and the target area information so that a central position of the calibration image on the sensing surface moves to a central position of the target area on the sensing surface;

deriving magnification from a ratio between a distance from the central position of the calibration image on the sensing surface to one side of the calibration image on a predetermined straight line passing through the central position of the calibration image and a distance from the central position of the calibration image to one side of the target area on the sensing surface on the straight line, in a state that the central position of the calibration image on the sensing surface has moved to the central position of the target area on the sensing surface; and controlling a view angle adjusting section which adjusts a view angle of the projection section, based on the magnification.

16. The image processing method as defined in claim 15, comprising:

generating information which indicates four corner coordinates of the calibration image on the sensing surface after distortion correction based on the sensing information, as the projection area information.

* * * * *